(12) United States Patent
Banavar et al.

(10) Patent No.: US 11,356,805 B2
(45) Date of Patent: Jun. 7, 2022

(54) DETERMINING LOCALIZATION FROM ORDINAL COMPARISON DATA

(71) Applicants: Mahesh K. Banavar, Potsdam, NY (US); Jie Sun, Potsdam, NY (US); Shandeepa Wickramasinghe, Potsdam, NY (US)

(72) Inventors: Mahesh K. Banavar, Potsdam, NY (US); Jie Sun, Potsdam, NY (US); Shandeepa Wickramasinghe, Potsdam, NY (US)

(73) Assignee: CLARKSON UNIVERSITY, Potsdam, NY (US)

(*) Notice: Subject to any disclaimer, the term of this patent is extended or adjusted under 35 U.S.C. 154(b) by 0 days.

(21) Appl. No.: 16/559,218

(22) Filed: Sep. 3, 2019

(65) Prior Publication Data
US 2020/0228926 A1 Jul. 16, 2020

Related U.S. Application Data

(60) Provisional application No. 62/726,209, filed on Sep. 1, 2018.

(51) Int. Cl.
*H04W 24/00* (2009.01)
*H04W 4/029* (2018.01)
*H04W 4/33* (2018.01)

(52) U.S. Cl.
CPC ............ *H04W 4/029* (2018.02); *H04W 4/33* (2018.02)

(58) Field of Classification Search
CPC ................................ H04W 4/029; H04W 4/33
USPC ........................................................ 455/456.1
See application file for complete search history.

(56) References Cited

U.S. PATENT DOCUMENTS

| | | | | |
|---|---|---|---|---|
| 5,512,908 A | * | 4/1996 | Herrick | H04W 64/00 342/387 |
| 5,589,821 A | * | 12/1996 | Sallen | G01S 13/84 340/539.1 |
| 5,818,346 A | * | 10/1998 | Goodwin, III | G06Q 30/02 340/8.1 |
| 9,510,154 B2 | * | 11/2016 | Mori | H04W 4/029 |
| 2004/0142660 A1 | * | 7/2004 | Churan | H04B 7/18563 455/12.1 |
| 2008/0227462 A1 | * | 9/2008 | Freyman | H04W 64/00 455/456.1 |
| 2013/0260782 A1 | * | 10/2013 | Un | H04W 64/00 455/456.1 |

(Continued)

*Primary Examiner* — Mark G. Pannell
(74) *Attorney, Agent, or Firm* — Bond Schoeneck & King, PLLC; George McGuire; Lacey Miller

(57) ABSTRACT

A method for determining location of a target within an indoor environment, including the steps of: classifying a set of anchors having known locations within the indoor environment and a set of targets having unknown locations within the indoor environment, wherein each of the anchors and targets comprise hardware having sensors and wireless communication capabilities; creating a set of ordinal pair data sets comprising relative distances between each target and all anchors; ranking and aggregating the ordinal pair data sets to produce a set of dissimilarities that approximate distances; transforming the dissimilarities into estimated distances between each anchor and target using the known distances between the anchors as calibration; and inferring location of targets by formulating and solving a multidimensional unfolding optimization.

2 Claims, 5 Drawing Sheets

(56) References Cited

U.S. PATENT DOCUMENTS

| | | | |
|---|---|---|---|
| 2016/0050541 A1* | 2/2016 | Youssef | G06F 16/29 |
| | | | 370/338 |
| 2018/0061126 A1* | 3/2018 | Huang | G06T 7/74 |
| 2019/0277939 A1* | 9/2019 | Li | G01S 5/02 |

* cited by examiner

DETERMINING LOCALIZATION FROM ORDINAL COMPARISON DATA

CROSS-REFERENCE TO RELATED APPLICATION

This application claims priority to U.S. Provisional Patent Application Ser. No. 62/726,209, filed on Sep. 1, 2018, and entitled "Localization from Ordinal Comparison Data," the entire disclosure of which is incorporated herein by reference.

GOVERNMENT FUNDING

N/A

FIELD OF THE INVENTION

The present disclosure is directed generally to a computer program product and method for determining localization from ordinal comparison data.

BACKGROUND

A main challenge in indoor localization arises from the lack of reliable distance measures due to the presence of walls, floors, furniture, and other dynamically changing conditions such as the movement of people and goods, varying temperature, and air flows. In this work, instead of direct use of unreliably measured distances, ordinal data that are obtained from pairwise distance comparisons is used. Such ordinal data are generally more reliable than direct distance measures. A computational framework, referred to as Ordinal UNLOC, estimates the location of target(s) based on ordinal data. The accuracy of location estimation using the framework is illustrated using numerical simulations.

A recent FCC document highlights the need for increasing the accuracy of localization when users call from mobile devices from indoor environments [1]. While the FCC recommends accurate localization to within 3 meters within 30 seconds, reports show that 90 percent of test calls have localization error greater than 100 meters. With a majority of 911 calls now being made from wireless devices, over 56 percent of which from indoor locations, the need for accurate indoor localization is paramount. A poor localization scheme can cause incorrect estimation of the room, the floor or even the actual building from which the call originates. In practice, despite being recognized as an important problem whose satisfactory solution can greatly improve safety, user experience, and be of critical importance in emergency situations such as rescuing people from collapsed and/or burning buildings, accurate indoor localization remains an open problem. In most buildings including the majority of schools, hospitals and shopping malls, there is generally no existing infrastructure (serving as "indoor GPS system") to facilitate localization. While in most cases it is possible to set up such an infrastructure with WiFi routers or Bluetooth beacons, the indoor setting poses a challenge. This is because indoor environments generally feature complex mutlipaths due to the presence of physical obstacles and barriers (e.g., walls, furniture, and people) and other factors that makes the accurate measurement of distance, either directly or indirectly, unreliable. Without reliable distance information, accurate localization seems to be a hopeless task.

Predominant research on indoor localization focuses on addressing the lack of infrastructure, by utilizing wireless sensor networks (WSN). The main idea is to place set of (low-cost, mobile) wireless sensors (called anchors) in a given environment where localization is to be performed. These sensors, together with the target node that is to be localized, form a sensor network via wireless communications. Assuming that the communication between the anchors and the target produces reasonable estimate of the distance between those, such approximate anchor-to-target distances together with the known location of the anchors are used to estimate the location of the target. Under this framework, many methods have been developed for target localization based on noisy distance measures, including multilateration and triangulation, linear and nonlinear optimization. However, as noted earlier, these types of methods are not suitable for practical indoor localization since the distances measured between the sensors, typically inferred from proxies such as time and power signals, are generally unreliable in indoor environments.

Accordingly, there is a need in the art for localization methods and systems that work in indoor environments.

SUMMARY

The present disclosure is directed to an estimation framework, referred to as Ordinal UNLOC, for indoor localization from possibly incomplete and noisy ordinal data. In this framework, direct measurement of distances is no longer required. Instead, comparative distances between pairs of devices are obtained, using (for example) signal strength measures or receive clock times in the case of time delay techniques, producing reliable ordinal distance comparisons. Thus, the crucial difference between the proposed approach and conventional localization methods is that in the Ordinal UNLOC approach, accurate sensor-to-sensor distance information is not required. Instead, all that is needed is to determine, between any pair sensors, which one is closer to a given reference sensor. The objective is to use these ordinal data in order to estimate the location of the target. The first step involves solving a "rank aggregation" problem, which, from the ordinal pairwise comparisons, produces a set of dissimilarities which serve as proximities for distances. Next, since the dissimilarities generally differ from actual distances, a set of functions are learned that transforms dissimilarities into distances, using available distance data measured among the anchors—those sensors for which the locations are known a priori. Finally, using the anchor-to-target distances estimated in the previous step, the location of the target is inferred by formulating and solving a multidimensional "unfolding" optimization. Thus, the Ordinal UNLOC approach takes special advantage of established techniques from machine learning, statistics, and optimization, to solve an outstanding practical engineering problem in signal processing.

According to an aspect is a method for determining location of a target within an indoor environment, comprising the steps of: classifying a set of anchors having known locations within the indoor environment and a set of targets having unknown locations within the indoor environment, wherein each of the anchors and targets comprise hardware having sensors and wireless communication capabilities; creating a set of ordinal pair data sets comprising relative distances between each target and all anchors; ranking and aggregating the ordinal pair data sets to produce a set of dissimilarities that approximate distances; transforming the dissimilarities into estimated distances between each anchor and target using the known distances between the anchors as calibration; and inferring location of targets by formulating and solving a multidimensional unfolding optimization.

According to an aspect is a system for determining location of a target within an indoor environment, comprising: a plurality of anchors each having known locations within the indoor environment and configured to sense an external stimulus and transmit a wireless signal; a plurality of targets positioned at unknown locations within the indoor environment, each target configured to sense an external stimulus and transmit a wireless signal; and a computer processor programmed, configured, and/or structured to: (i) classify the plurality of anchors having known locations within the indoor environment and the plurality of targets having unknown locations within the indoor environment; (ii) create a set of ordinal pair data sets comprising relative distances between each target and all anchors; (iii) rank and aggregate the ordinal pair data sets to produce a set of dissimilarities that approximate distances; (iv) transform the dissimilarities into estimated distances between each anchor and target using the known distances between the anchors as calibration; and (v) infer location of the targets by formulating and solving a multidimensional unfolding optimization.

These and other aspects of the invention will be apparent from the embodiments described below.

BRIEF DESCRIPTION OF THE DRAWINGS

The present invention will be more fully understood and appreciated by reading the following Detailed Description in conjunction with the accompanying drawings, in which.

DETAILED DESCRIPTION OF EMBODIMENTS

The present disclosure describes a manner of determining localization from ordinal comparison data in in rich scattering environments such as indoor malls, hospitals, etc. (for simplicity, referred to as "indoor environments").

Figure 1A:
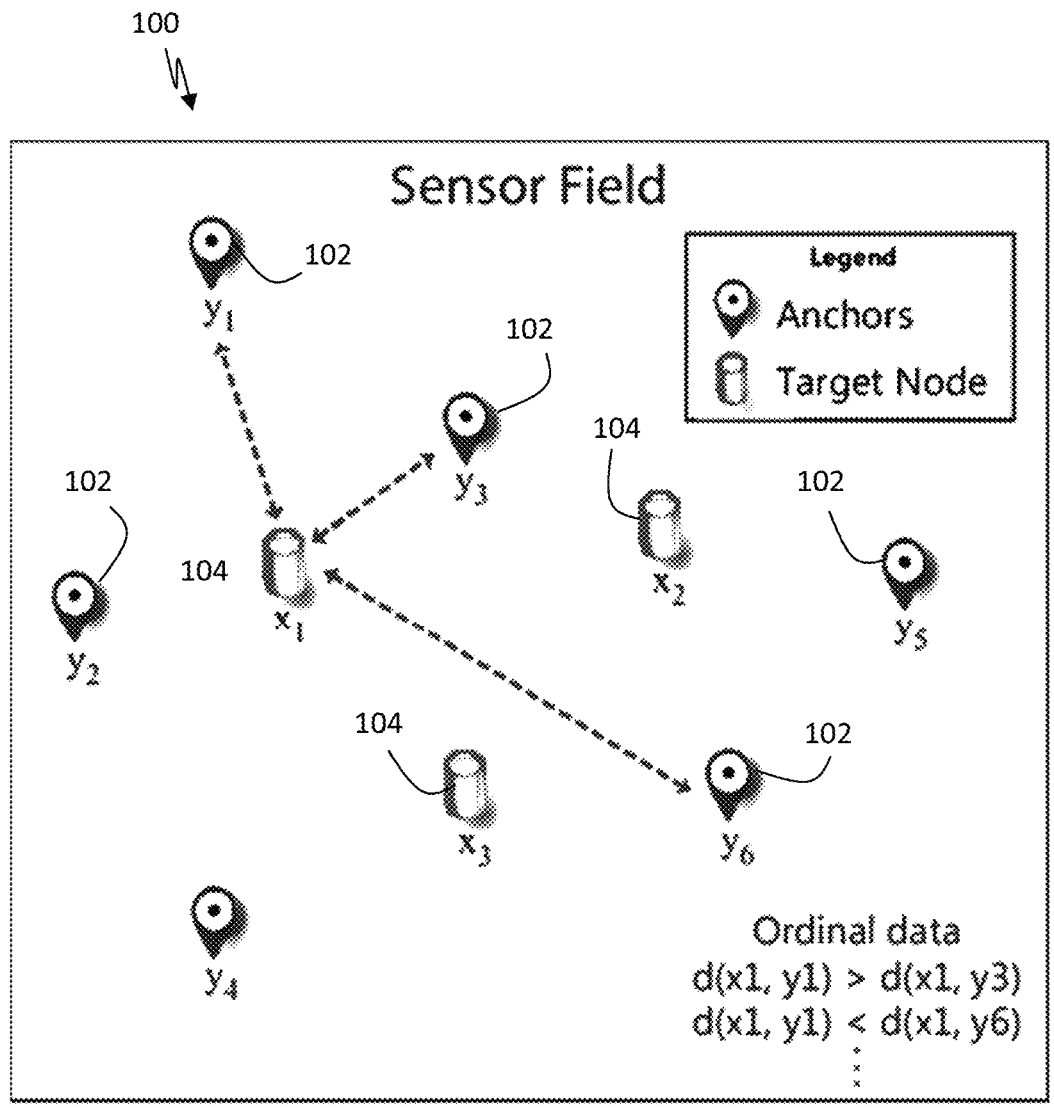
FIG. 1(a) is a schematic showing a sensor field (shaded in light gray) that contains anchors (sensors at known locations, denoted by circles) and target nodes (sensors at unknown locations, marked as diamonds), in accordance with an embodiment.

Referring to FIG. 1, in one embodiment, is a sensor field 100 in an indoor environment. Sensors are classified based on whether their locations are known or unknown: sensors at known locations are referred to as anchors 102 and those at unknown locations as target nodes or simply targets (or nodes) 104. Sensors 102/104 are any hardware device configured with sensing and wireless communications capabilities, such as smart phones, for example. As an example, the sensor could be a sound sensor (microphone), such that audio inputs can be sensed and the methodology employed for localizing audio signals, such as in shooter localization, and tracking pests such as mice based on their squeaks. An aspect of the invention is to focus on the challenging problem of localization where direct distance measures are not available, but only ordinal data that come from comparative anchor-to-target distances, as describe by the system model below. The system contains m anchors 102 at known locations and n target nodes 104 at unknown locations within the indoor environment. The total number of sensors is denoted as:

N=m+n. We use $y_i = [y_{1i}, \ldots, y_{qi}]^T \in \mathbb{R}^q$ and $x_j = [x_{1j}, \ldots, x_{qj}]^T \in \mathbb{R}^q$ to represent the coordinates of the i-th anchor (i=1, ..., m) and those of the j-th target (j=1, ..., n) in a q-dimensional space, respectively. Typically q=2 or q=3 in practical applications. We classify the distances between sensor pairs into three types: anchor-to-anchor, anchor-to-target, and target-to-target, which we represent using three matrices: $D^Y = [d_{ij}^Y]_{m \times m}$, $D^X = [d_{ij}^X]_{n \times n}$, and $D^{YX} = [d_{ij}^{YX}]_{m \times n}$, respectively, where $$\begin{cases} d_{i,j}^Y = \|y_i - y_j\|, \\ d_{i,j}^X = \|x_i - x_j\|, \\ d_{i,j}^{YX} = \|y_i - x_j\|. \end{cases} \tag{1}$$

We also define an aggregated distance matrix $D = [d_{ij}]_{N \times N}$ as $$D = \begin{pmatrix} D^Y & D^{YX} \\ D^{XY} & D^X \end{pmatrix}, \tag{2}$$

where $D^{XY}$ is the transpose of $D^{YX}$. When we refer to the sensors without specifying their type, the first m sensors are the anchors and the last n sensors correspond to the targets, so sensor i for $1 \le i \le m$ refers to the i-th anchor, whereas sensor m+j refers to the j-th target node (j=1, ..., n).

Since the anchors' 102 locations are known, the matrix $D^Y$ can be directly obtained. However, none of $D^X$, $D^{YX}$, and $D^{XY}$ is available. The unavailability of the anchor-to-target distances (as encoded in $D^{YX}$ and $D^{XY}$) is in contrast to most localization setups. Instead, the only reliable information are ordinal comparisons between anchor-sensor distance measurements (we use ordinal comparisons since the actual distance measurements, especially in indoor environments are unreliable [16]-[18], [36]-[38]). In particular, for each sensor triplet (i, j, k), compare the "signal strengths" from sensor i and from sensor j can be compared to the reference sensor k, respectively, to determine which sensor (between i and j) is closer to k.

We denote the binary outcome of such a pairwise comparison as $z_{ij}^{(k)}$, which generally depends on some unknown function f of the actual distances $d_{ik}$ and $d_{jk}$, as:

$$z_{ij}^{(k)} = f(d_{ik}, d_{jk}, \xi_{ij}^{(k)}), \tag{3}$$

where $\xi_{ij}^{(k)}$ represents noise in such a comparison. Due to skew symmetry constraints (i being closer to k than j is the same as j being farther away from k than i, and vice versa), we assume that $\xi_{ij}^{(k)} = -\xi_{ji}^{(k)}$ and require that $f(d, d', \xi) = -f(d', d, -\xi)$, which ensures that $z_{ij}^{(k)} = -z_{ji}^{(k)}$ ($\forall i, j, k$). Here, we focus on the most basic form of comparisons, namely ordinal comparisons, together with the simple "thresholding" comparison function $$f(d,d',\xi)=\text{sgn}(d-d'+\xi)\in\{-1,1\}, \quad (4)$$

where sgn(•) is the signum function [39]. Note that this is in fact a special case of the logistic function $f(d, d', \xi)=1/[1+e^{-\beta(d-d'+\xi)}]$ in the limit of the parameter $\beta\to\infty$. The collection of all pairwise comparisons form N square matrices: $\{Z^{(k)}\}$, where $Z^{(k)}=[z_{ij}^{(k)}]_{N\times N}$ (k=1, . . . , N), which we refer to as pairwise comparison matrices.

We now summarize the problem of localization from ordinal data below.

---

Localization from ordinal data

Setup: Consider a sensor field that contains m anchors at known locations $\{y_i\}_{i=1}^m$ and n target nodes at unknown locations $\{x_j\}_{j=1}^n$.
Given: (1) location of the anchors $\{y_i\}_{i=1}^m$ and (2) ordinal comparison data $\{Z^{(k)}\}_{k=1}^N$, where N = m + n and each matrix $Z^{(k)} = [z_{ij}^{(k)}]_{N\times N}$.
Goal: The localization problem is to estimate the location of the targets $\{x_j\}_{j=1}^n$.

---

Figure 1B:
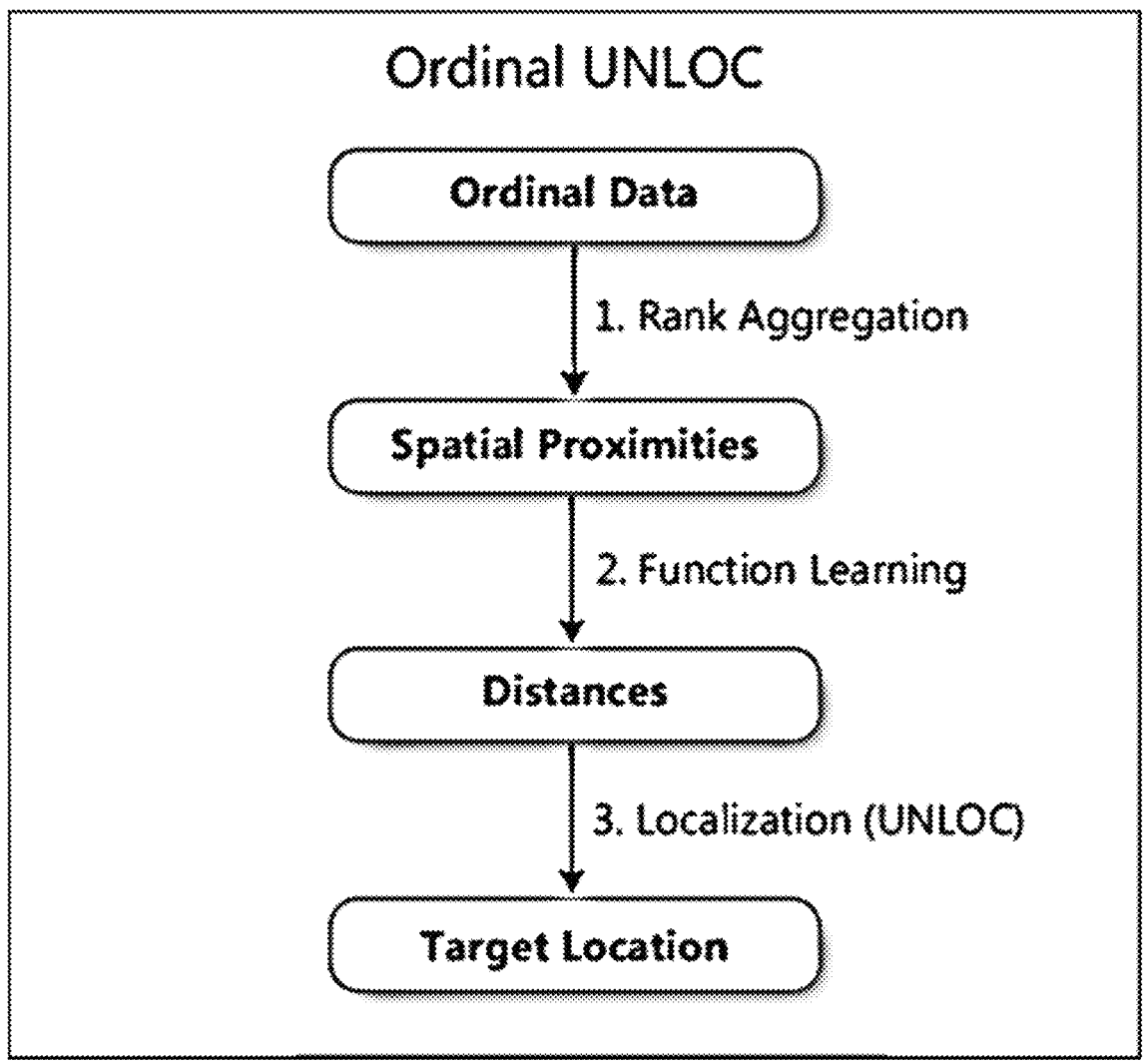
FIG. 1(b) is a flow chart of the proposed Ordinal UNLOC method to estimate the location of target nodes based on ordinal data, in accordance with an embodiment.

The present computational estimation approach, referred to as Ordinal Unfolding-based Localization (Ordinal UNLOC), consists of three main steps (see FIG. 1(b)). First, from the ordinal comparison data, we apply rank aggregation to obtain a set of "dissimilarities", which, for a given reference sensor k, assigns a score to each sensor that serves as proximity to its distance to k according to the ordinal data and rankings. Such set of spatial proximities (scores) are not unique, as any shifting and (positive) scaling preserves the ranking of the scores. Consequently, the scores obtained in this step cannot be directly used as (approximate) anchor-to-target distances for localization. Next, the estimated distance proximities among the anchors together with the (known) anchor-to-anchor distances are used to fit functions that best transform proximities into distances, and such functions are then applied to obtain an estimation of anchor-to-target distances. Finally, given the location of anchors and (estimated) anchor-to-target distances, we formulate a multidimensional unfolding optimization for each target, whose solution represents a (best) estimation of the location of that target. Below the details of each of these main steps are described, along with brief discussion of their effects.

Rank Aggregation from Ordinal Data

The first step in Ordinal UNLOC is to use a rank aggregation method to infer spatial proximities from the ordinal data. For each reference sensor k, we seek a set of scores, denoted by $\psi^{(k)}=[\psi_{1k}, \ldots, \psi_{m+n,k}]^T$, that serve as proximities and ideally preserves the ordinal data as constraints, such that the $\psi_{ik}>\psi_{jk}$ if and only if $d_{ik}>d_{jk}$ (or in other words, $z_{ij}^{(k)}=1$). Note that this is equivalent to requiring the ranking of the entries in each $\psi^{(k)}$ be identical (or as close as possible) to the ranking of the entries of the k-th column of D, which we denote as $$d^{(k)}=[d_{1k}, \ldots, d_{Nk}]^T. \quad (5)$$

The problem of inferring the ranking or scoring of a set of items from their pairwise comparisons is commonly known as "rank aggregation", interpreting each pairwise comparison as assigning a local ranking between two items, with the goal of obtaining an aggregated global ranking that preserves these local rankings as much as possible. Several methods are available for solving a rank aggregation problem, most of which computes a score for each item based on collection of ordinal data.

For the present invention, a common, easy-to-implement, and effective method, referred to as HodgeRank or simply least squares (LS) ranking is preferably used. The idea is to formulate a (linear) least squares problem using the ordinal data as inputs, the solution of which gives the estimated spatial proximities (which approximately preserves distance orderings from the comparison data). To formulate the problem, we consider an arbitrary enumeration of the set of all ordered pairs of sensors, where the l-pair is denoted by $(i_l, j_l)$, defining a set:

$$E = \{(i_\ell, j_\ell) : \ell = 1, \ldots, M\} \quad (6)$$

$$= \{(i, j) \in \mathbb{N}^2 : 1 \leq i < j \leq N\},$$

where M=N(N−1)/2, Thus, E can be interpreted as the edge set of a complete graph of N nodes, and $\{(i_l, j_l)\}$ is an ordered list of all the edges. From this, we define the corresponding incidence matrix $B=[b_{l,q}]_{M\times N}$ [44], when $$b_{\ell,q} = \begin{cases} 1, & \text{if } q = i_\ell, \\ -1, & \text{if } q = j_\ell, \\ 0, & \text{otherwise.} \end{cases} \quad (7)$$

For each sensor k, the ordinal data in matrix $Z^{(k)}$ can be effectively represented by a column vector $$z^{(k)}=[z_{i_1,j_1}^{(k)}, \ldots, z_{i_M,j_M}^{(k)}]^T \in \mathbb{R}^M, \quad (8)$$

(again) following the same enumeration of pairs as in the incidence matrix. Then, the LS ranking method solves a linear least squares problem, to yield $$\psi^{(k)} = \underset{\psi \in \mathbb{R}^N, 1^T\psi=0}{\text{argmin}} \|B\psi - z^{(k)}\|. \quad (9)$$

Such a solution can be computed in several ways, for example, using normal equations [45], to produce $$\psi^{(k)}=(B^TB)^\dagger B^Tz^{(k)}+c\mathbf{1}, \quad (10)$$

where $(\bullet)^\dagger$ denotes the pseudoinverse of a matrix [45] (the matrix $B^TB$ is also known as the graph Laplacian, which is generally noninvertible), and the constant c is chosen such that the condition $\mathbf{1}^T\psi^{(k)}=0$ is satisfied. Finally, we collect the vectors $\psi^{(k)}$ into a matrix of proximities $$\Psi=[\psi^{(1)}, \ldots, \psi^{(N)}]. \quad (11)$$

We partition this matrix in the same way as the aggregated distance matrix D, so that $$\Psi_{N\times N} = \begin{pmatrix} \Psi^Y_{m\times m} & \Psi^{YX}_{m\times n} \\ \Psi^{XY}_{n\times m} & \Psi^X_{n\times n} \end{pmatrix}, \qquad (12)$$

where $\Psi^{XY}$ is the transpose of $\Psi^{YX}$.

Function Learning: Estimating Distances from Spatial Proximities

The second step of is to estimate the (unknown) anchor-to-target distances from the matrix of spatial proximities $\Psi$ obtained by rank aggregation in the previous step together with the known anchor-to-anchor distances. In particular, for each sensor k that is an anchor (so $1 \le k \le m$) we learn a function $g_k$ that maps the (estimated) proximities with respect to anchor k into (known) distances $d_{ik}$, so that $d_{ik} \approx g_k(\psi_i^{(k)})$ (i=1, ..., m). Since $d_{ik}$ is only known for $1 \le i \le m$ (i.e., distance between pairs of anchors), the function $g_k$ needs to be inferred from the k-th column of the anchor-to-anchor distance matrix $D^Y$ and that of the dissimilarity matrix $\Psi^Y$, which we denote as $d_k^Y$ and $\psi_k^Y$, respectively.

We express $g_k$ using a basis expansion. For example, under the standard polynomial basis, we have the representation $$g_k(\psi) = \sum_{i=0}^{\infty} c_i^{(k)} \psi^i. \qquad (13)$$

To preserve the ordering among the dissimilarities, $g_k$ must be a monotonic function. Under this additional constraint, a truncated series to the first order is achieved and so $g_k$ becomes just a linear function:

$$g_k(\psi) = c_0^{(k)} + c_1^{(k)} \psi,$$

where the coefficients $c_0^{(k)}$ and $c_1^{(k)}$ are to be determined from the vectors $d_k^Y$ and $\psi_k^Y$. This can be done via solving a linear regression problem, for example, using standard least squares, producing $$c^{(k)} = \left[c_0^{(k)}, c_1^{(k)}\right]^T = \underset{c \in \mathbb{R}^2, c_1 > 0}{\mathrm{argmin}} \|[1, \psi_k^Y]c - d_k^Y\|, \qquad (15)$$

for k=1, ..., m, (every anchor). From these coefficients, we compute a preliminary estimate of the distance from the k-th anchor to the targets, using the formula $$\tilde{d}_k^{XY} = [\tilde{d}_{1k}^{XY}, \ldots, \tilde{d}_{nk}^{XY}]^T = c_0^{(k)} + c_1^{(k)} \psi_k^{XY}. \qquad (16)$$

Thus, repeat the procedure for all the anchors (k=1, ..., m) produces a preliminary estimate of the anchor-to-target distance matrix, $\tilde{D}^{XY}$ (or equivalently, $\tilde{D}^{YX}$, by transposing $\tilde{D}^{XY}$).

Before moving on to the next step of localization, it is important to recalibrate the estimated anchor-to-target distances, for the following reason.
Consider the j-th target node (j∈{1, ..., n}), whose distances
  to the anchors are preliminarily estimated to form the j-th column of $\tilde{D}^{YX}$, denoted by $$\tilde{d}_j^{YX} = [\tilde{d}_{1j}^{YX}, \ldots, \tilde{d}_{mj}^{YX}]. \qquad (17)$$

for each j=1, ..., n, thus forming the estimated anchor-to-target distance matrix $\tilde{D}^{YX}$ and also its transpose $\tilde{D}^{XY}$.

For each anchor k∈{1, ..., m}, the entry $\tilde{d}_{kj}^{YX}$ is obtained from its corresponding function $g_k$, which generally differs from anchor to anchor. The error in fitting $g_k$ can cause the ordering of $\tilde{d}_{kj}^{YX}$'s to differ from the ordering of the true distances $d_{kj}^{YX}$, or even different from the estimated proximities $\psi_{kj}^{YX}$. For each target node j, to best ensure that the estimated anchor-to-target distances preserves the ordering of estimated proximities, we re-fit a linear function $g_{m+j}$, in the same form as Eq. (14), but now intended to learn a monotonic function that transforms the anchor-to-target proximities to the preliminary estimate, of anchor-to-target distances (in place of the unknown distances), giving $$c^{(m+j)} = \left[c_0^{(m+j)}, c_1^{(m+j)}\right]^T = \underset{c \in \mathbb{R}^2, c_1 > 0}{\mathrm{argmin}} \|[1, \psi_j^{YX}]c - \tilde{d}_j^{YX}\|, \qquad (18)$$

for j=1, ..., n, where $\psi_j^{YX} = [\psi_{1j}^{YX}, \ldots, \psi_{mj}^{YX}]$. Finally, we use the function $g_{m+j}$ to recalibrate the estimated anchor-to-target distances, as $$\hat{d}_j^{YX} = c_0^{(m+j)} + c_1^{(m+j)} \psi_j^{YX}, \qquad (19)$$

Unfolding Localization from Distance Measures

For each of target node j (i.e., sensor m+j where $1 \le j \le n$), the estimated anchor-to-target distances together with the location of the anchors can be used to infer the location of the target xj. We achieve this by formulating an unfolding optimization, with cost function $$J(x, Y; \delta) = \sum_{i=1}^{m} (\|x - y_i\|^2 - \delta_i)^2,$$

where the matrix $Y = [y_1, \ldots, y_m]$ and $\delta = [\delta_1, \ldots, \delta_m]^T$. UNLOC computes x as a global minimizer of J for fixed Y (representing anchor locations) and $\delta$ (representing approximate anchor-to-target distances). Applying UNLOC to each column of the estimated distance matrix $\hat{D}^{YX}$ leads to the estimated location of all the targets, that is, we compute, for each j=1, ..., n, $$\hat{x}_j = \underset{x}{\mathrm{argmin}} J\left(x, Y; \hat{d}_j^{YX}\right),$$

using a (global) optimization routine (see Ref. [46]).

In this section, the performance of Ordinal UNLOC using simulated sensor fields and ordinal comparison data is benchmarked, and Ordinal UNLOC is applied to real-world data collected by field experiments for target localization.

Simulation Tests

To test the validity of Ordinal UNLOC for target localization, synthetic datasets are constructed via numerical simulations, described as follows. In each simulation test, a set of N sensors m anchors and n targets where N=m+n are placed randomly inside the unit square $[0,1]^2$.

Figure 2A:
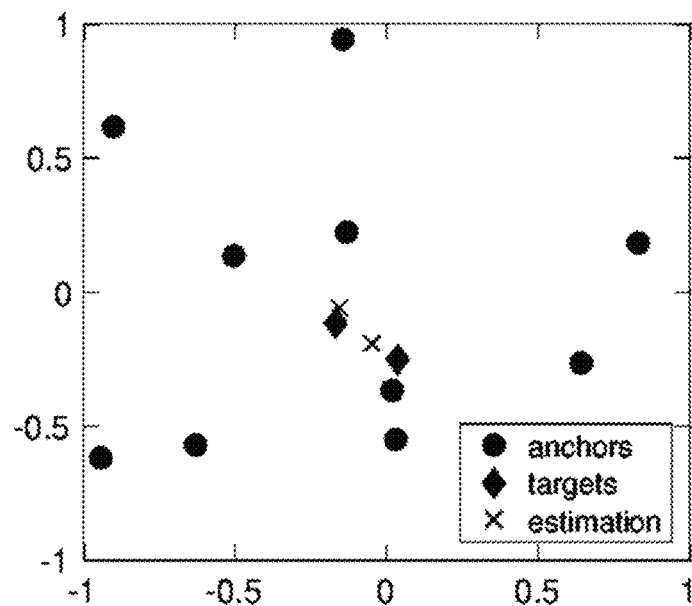
FIG. 2(a) is a graph showing an example of Ordinal UNLOC localization with m=10 anchors (circles) and n=2 targets (diamonds), in accordance with an embodiment.

Simulation test 1: Demonstration of typical localization outcome. A typical localization example, as in FIG. 2(a), where m=10 anchors are used with n=2 target to be localized, all placed in $[0, 1]^2$. The ordinal distance comparison data are generated under the noisy threshold model (4), where the noise is Gaussian with mean 0 and standard deviation σ=0.1. The estimated target locations obtained from Ordinal UNLOC are very close to the actual locations.

Figure 2B:
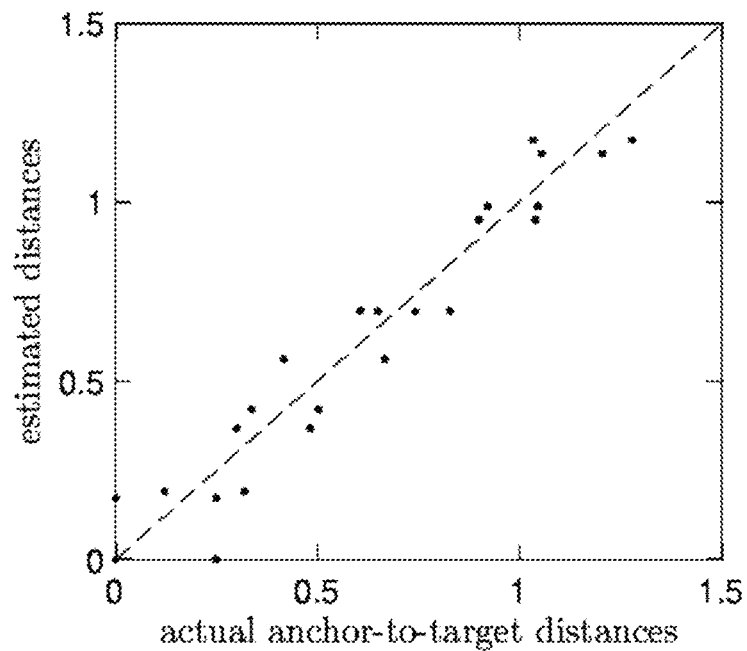
FIG. 2(b) is a graph showing actual distances between the anchors and the target versus those obtained from the estimated target locations, in accordance with an embodiment.

With reference to FIG. 2. (a) An example of Ordinal UNLOC localization with m=10 anchors (circles) and n=2 targets (diamonds). Ordinal distance comparisons are generated using the noisy threshold model (3)-(4) with and Gaussian noise (mean 0, standard deviation 0.1). The estimated target locations using Ordinal UNLOC are marked by blue crosses, which are very close to the actual targets. FIG. 2(b) shows actual distances between the anchors 102 and the target 104 versus those obtained from the estimated target locations.

Figure 3:
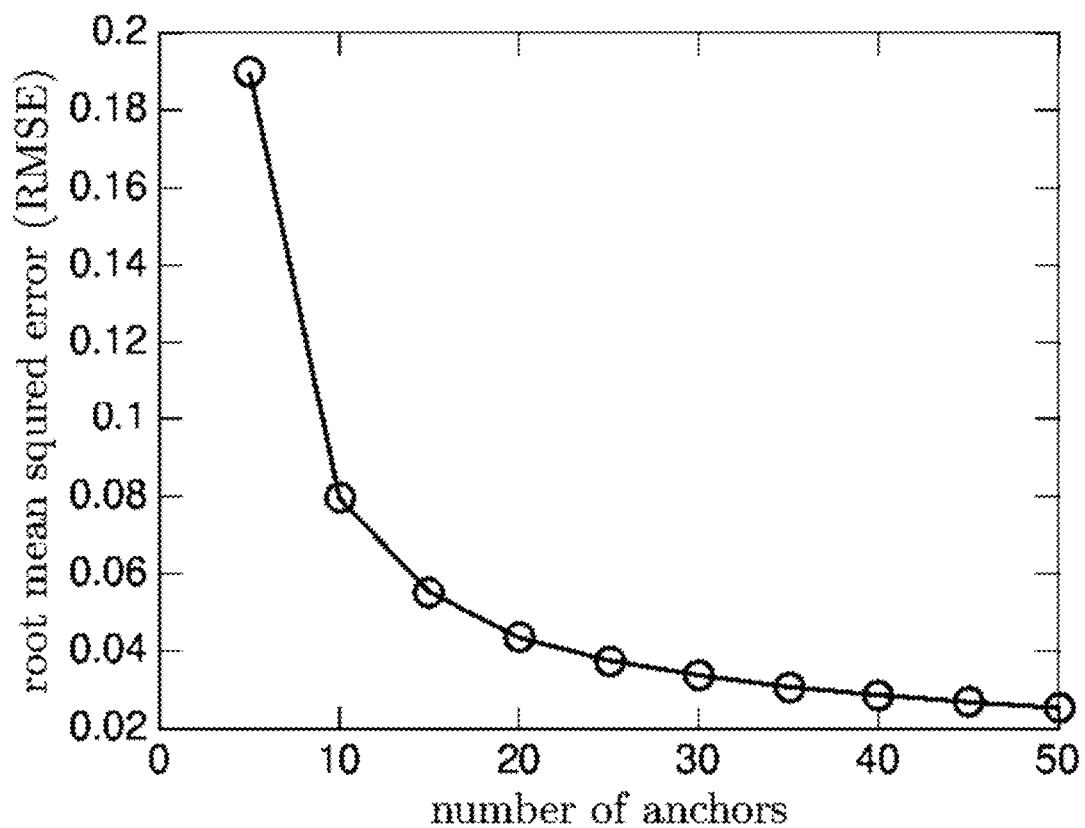
FIG. 3 is a graph showing the dependence of localization error on the number of anchors, in accordance with an embodiment.

Simulation test 2: Dependence of localization error on the number of anchors 102. Next, it is determined how the localization accuracy changes as more anchors become available; in particular, in the case of a single target node (n=1), where ordinal comparisons are made in the absence of noise. The number of anchors m 102 are varied from 5 to 50. For each m, 5000 independent numerical localization experiments are performed where in each simulation test the sensors are randomly placed in [0,1]2 and the target location is estimated using Ordinal UNLOC. Localization error is computed as the distance between the true and the estimated target locations, and plot the root mean squared error (RMSE) of localization as a function of the number of anchors in FIG. 3. It is evident that the localization error rapidly decreases as more anchors are used.

Simulation test 3. Dependence of localization error on the level of noise. Next, the impact of noise in ordinal comparisons is determined with a particular focus on fixed number of anchors m=10 and target nodes n=1.

For each (i, j, k) triplet with i<j, the value of noise is drawn independently from a normal distribution $\mathcal{N}(0,\sigma^2)$ (recall that we enforce the constraint $\xi_{ji}^{(k)}=-\xi_{ij}^{(k)}$ for all pairs.)

Figure 4:
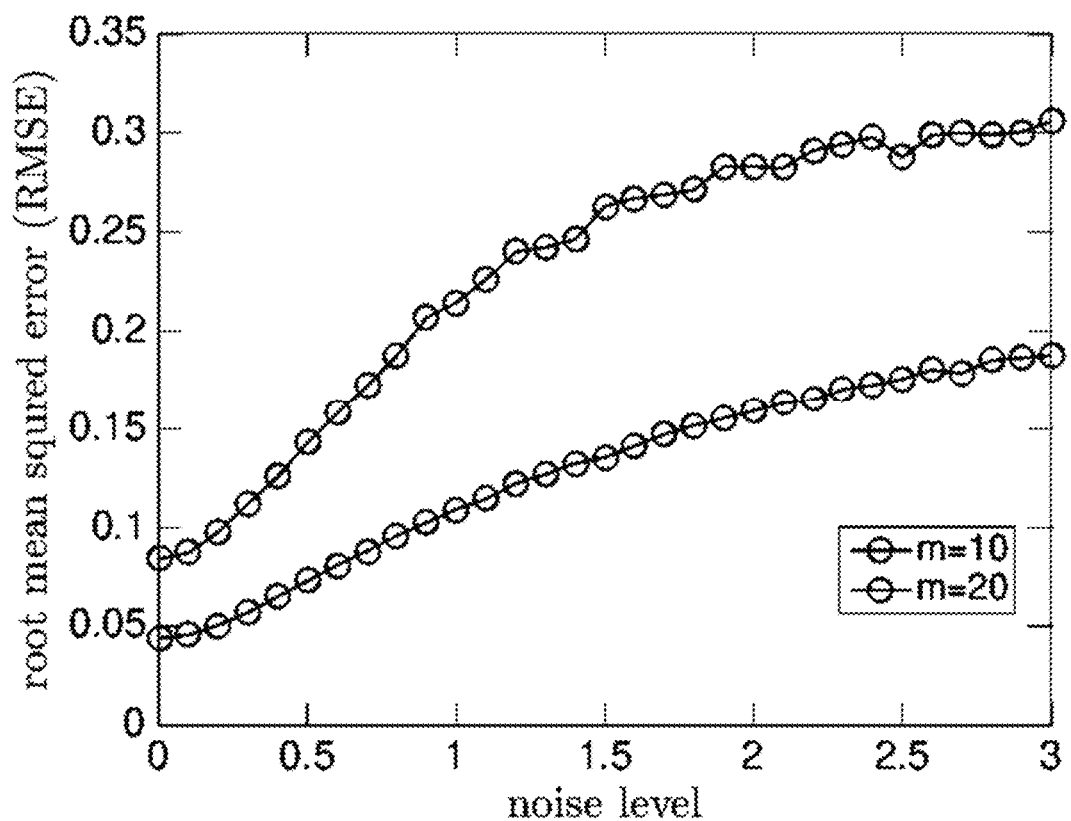
FIG. 4 is a graph showing the dependence of localization error on the level of noise, in accordance with an embodiment.

In FIG. 4, the localization RMSE as a function of the noise std σ is plotted, finding that RMSE increases gradually as noise level becomes higher as is expected. The tests are repeated but with double number of anchors m=20, and plot the RMSE curve in the same figure, which is (again, expectedly) lower than that corresponding to m=10. These results suggest that increase of the number of available anchors can be used to compensate the impact of noise in localization.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

The following references are incorporated herein by reference (and referred to elsewhere herein by reference number):

[1] "Federal communications commission, wireless e911 location accuracy requirements," 2014.

[2] Working Group 3, "E9-1-1 location accuracy: Indoor localization test bed report," *The Communications Security, Reliability and Interoperaability Council*, March 2013.

[3] "Consumer reports magazine, "for 911, is a cell phone as safe as a landline"?", Available Online at http://www.consumerreports.org/cro/magazine-archive/2011/january/electronics/best-cell-phones/911-from-cell-phone/index-.htm (Jul. 15, 2016).

[4] C. Carle, "Indoor location: The mobile revolution starts now" directions magazine, Available Online at http://www.directionsmag.com/articles/indoor-location-the-mobile-revolution-starts-now/334122 (Jul. 15, 2016).

[5] P. Tragas, A. Kalis, C. Papadias, F. Ellinger, R. Eickhoff, T. Ussmuller, R. Mosshammer, M. Huemer, A. Dabek, D. Doumenis, and A. Kounoudes, "Resolution: Reconfigurable systems for mobile local communication and positioning." in 2007 16*th* 1*ST Mobile and Wireless Communications Summit*, July 2007, pp. 1-5.

[6] A. Matic, A. Popleteev, V. Osmani, and O. Mayora-Ibarra, "An indoor positioning system based on a WiFi router and FM beacons," In *Proc*. 18*th Telecommunications forum TELFOR* 2010, 2010.

[7] Krishna Chintalapudi, Anand Padmanabha Iyer, and Venkata N. Padmanabhan, "Indoor localization without the pain," *Proceedings of the sixteenth annual international conference on Mobile computing and networking—MobiCom,* 2010.

[8] Ramsey Faragher and Robert Harle, "Location fingerprinting with bluetooth low energy beacons," *IEEE Journal On Selected Areas in Communications*, vol. 33, no. 11, pp. 2418-2428, November 2015.

[9] Mohamed Er Rida, Fuqiang Liu, Yassine Jadi, Amgad Ali Abdullah Algawhari, and Ahmed Askourih, "Indoor location position based on bluetooth signal strength," 2*nd International Conference on Information Science and Control Engineering,* 2015.

[10] R. K. Diwate and D. N. Rewadkar, "Indoor tracking using Wi-Fi routers on a smartphone," *International Journal of Science and Research (IJSR)*, vol. 4, no. 7, pp. 2319-2322, 7 2015.

[11] Song Chai, Renbo An, and Zhengzhong Du, "An indoor positioning algorithm using bluetooth low energy RSSI," in *International Conference on Advanced Material Science and Environmental Engineering* (*AMSEE* 2016), *Thailand*, June 2016.

[12] Pavel Kriz, Filip Maly, and Tomas Kozel, "Improving indoor localization using bluetooth low energy beacons," *Mobile Information Systems*, vol. 2016, pp. 1-11, 2016.

[13] Neal Patwari, Alfred O Hero, Matt Perkins, Neiyer S Correal, and Robert J O'dea, "Relative location estimation in wireless sensor networks," *IEEE Transactions on signal processing*, vol. 51, no. 8, pp. 2137-2148, 2003.

[14] Neal Patwari, Joshua N Ash, Spyros Kyperountas, Alfred O Hero, Randolph L Moses, and Neiyer S Correal, "Locating the nodes: cooperative localization in wireless sensor networks," *IEEE Signal processing magazine*, vol. 22, pp. 54-69, 2005.

[15] H. Wymeersch, J. Lien, and M. Z. Win, "Cooperative localization in wireless networks," *Proceedings of the IEEE*, vol. 97, pp. 427-450, February 2009.

[16] Marc Willerton, M Banavar, Xue Zhang, Athanassios Manikas, Cihan Tepedelenlioglu, Andreas Spanias, Trevor Thornton, E Yeatman, and A Constantinides, "Sequential wireless sensor network discovery using wide aperture array signal processing," in *Signal Processing Conference (EUSIPCO). 2012 Proceedings of the 20117 European*. IEEE, 2012.

[17] X. Zhang, M. K. Banavar, M. Willerton, A. Manikas, C. Tepedelenlioglu, A. Spanias, T. Thornton, E. Yeatman, and A. G. Constantinides, "Performance comparison of localization techniques for sequential wsn discovery," in *Sensor Signal Processing for Defense*. IEEE, 2012.

[18] X. Zhang, M. K. Banavar, M. Willerton, A. Manikas, C. Tepedelenlioglu, A. Spanias, T. Thornton, E. Yeatman, and A. G. Constantinides, "Performance comparison of localization techniques for sequential wsn discovery," in *Sensor Signal Processing for Defence (SSPD 2012)*, September 2012, pp. 1-5.

[19] Xue Zhang, Cihan Tepedelenlioglu, Mahesh Banavar, and Andreas Spanias, "Crlb for the localization error in the presence of fading," in *Acoustics, Speech and Signal Processing (ICASSP), 2013 IEEE International Conference on*. IEEE, 2013.

[20] X. Zhang, C. Tepedelenlioglu, M. Banavar, and A. Spanias, *Node Localization in Wireless Sensor Networks*, Morgan and Claypool, 2016.

[21] A. Beck, P. Stoica, and Jian Li, "Exact and approximate solutions of source localization problems," *IEEE Transactions on Signal Processing*, vol. 56, no. 5, pp. 1770-1778, May 2008.

[22] F. K. W. Chan and H. C. So, "Efficient weighted multidimensional scaling for wireless sensor network localization," *IEEE Transactions on Signal Processing*, vol. 57, no. 11, pp. 4548-4553, November 2009.

[23] G. Wang and K. Yang, "Efficient semidefinite relaxation for energy-based source localization in sensor networks," in *2009 IEEE International Conference on Acoustics, Speech and Signal Processing*, April 2009, pp. 2257-2260.

[24] Mohammad Reza Gholami, Henk Wymeersch, Erik G Strom, and Mats Rydstrom, "Wireless network positioning as a convex feasibility problem," *EURSIP* 2011, January 2011.

[25] Adrian Ozer and Eugene John, "Improving the accuracy of bluetooth low energy indoor positioning system using kalman filtering," *International Conference on Computational Science and Computational Intelligence (CSCI)*, 2016.

[26] Marco Altini, Davide Brunelli, Elisabetta Farella, and Luca Benini, "Bluetooth indoor localization with multiple neural networks," *IEEE 5th International Symposium on Wireless Pervasive Computing*, 2010.

[27] Filippo Palumbo, Paolo Barsocchi, Stefano Chessa, and Juan Carlos Augusto, "A stigmergic approach to indoor localization using bluetooth low energy beacons," *12th IEEE International Conference on Advanced Video and Signal Based Surveillance (AVSS)*, 2015.

[28] M. R. Gholami, R. M. Vaghefi, and E. G. Strom, "Rss-based sensor localization in the presence of unknown channel parameters," *IEEE Transactions on Signal Processing*, vol. 61, no. 15, pp. 3752-3759, August 2013.

[29] Haojian Jin, Cheng Xu, and Kent Lyons, "Corona: Positioning adjacent device with asymmetric bluetooth low energy RSSI distributions," *Proceedings of the 28th Annual ACM Symposium on User Interface Software and Technology—UIST*, 2015.

[30] F. Benedetto, G. Giunta, and E. Guzzon, "A novel "single-path" vs. "few-path" test based on higher order statistics to possibly start-up coherent combining," *Journal of Applied Research and Technology*, vol. 13, no. 1, pp. 7-19, 2015.

[31] Yankai Wang, Qingyu Yang, Guangrui Zhang, and Peng Zhang, "Indoor positioning system using euclidean distance correction algorithm with bluetooth low energy beacon," *2016 International Conference on Internet of Things and Applications (IOTA)*, 2016.

[32] A Juri, T Arslan, and F Wang, "Obstruction-aware bluetooth low energy indoor positioning," *Proceedings of the 29th International Technical Meeting of The Satellite Division of the Institute of Navigation (ION GNSS+ 2016)*, 2016.

[33] Gale Young and Alston S Householder, "Discussion of a set of points in terms of their mutual distances," *Psychometrika*, vol. 3, no. 1, 1938.

[34] Warren S Torgerson, "Multidimensional scaling of similarity," *Psychometrika*, vol. 30, no. 4, 1965.

[35] Valen E Johnson and J Albert, *Ordinal Data Modeling {Statistics for Social Science and Public Policy}*, Springer-Verlag New York Incorporated, 1999.

[36] K. Mack and M. K. Banavar, "Bluetooth localization on android," in *SURE Conference*, 2015.

[37] M. Banavar and K. Mack, "Localization using wireless signals," 2017, U.S. patent application Ser. No. 15/419,390.

[38] Kevin V. Mack, Mahesh K. Banavar, and Sumona Mondal, "Statistical methods for improving bluetooth low energy ranging and localization," *IEEE International Conference on Acoustics, Speech, and Signal Processing (ICASSP) 2017 (submitted)*, 2017.

[39] J. Spanier and K. B. Oldham, *An Atlas of Functions*, Hemisphere Publishing Corporation, 1987.

[40] Xi Chen, Paul N Bennett, Kevyn Collins-Thompson, and Eric Horvitz, "Pairwise ranking aggregation in a crowdsourced setting," in *Proceedings of the sixth ACM international conference on Web search and data mining*. ACM, 2013, pp. 193-202.

[41] Ammar Ammar and Devavrat Shah, "Efficient rank aggregation using partial data," in *ACM SIGMETRICS Performance Evaluation Review*. ACM, 2012, vol. 40, pp. 355-366.

[42] Sahand Negahban, Sewoong Oh, and Devavrat Shah, "Rank centrality: Ranking from pairwise comparisons," *Operations Research*, vol. 65, no. 1, pp. 266-287, 2016.

[43] Xiaoye Jiang, Lek-Hong Lim, Yuan Yao, and Yinyu Ye, "Statistical ranking and combinatorial hodge theory," *Mathematical Programming*, vol. 127, no. 1, pp. 203-244, 2011.

[44] John Adrian Bondy, Uppaluri Siva Ramachandra Murty, et al., *Graph theory with applications*, vol. 290, Citeseer, 1976.

[45] G. H. Golub and C. F. Van Loan, *Matrix computations*, vol. 3, JHU Press, 2012.

[46] Sun J., Yang T., Mack K. V., and Banavar M. K., "Unloc: Optimal unfolding localization from noisy distance data," *under review in Sampling Theory in Signam and Image Processing*, 2018.

What is claimed is:

1. A method for determining location of a target within an indoor environment, comprising the steps of:
   a) classifying a set of sensors as being either anchors or targets wherein anchors have known locations within the indoor environment and targets have unknown locations within the indoor environment, wherein each of the anchors and targets comprise hardware having sensing and wireless communication capabilities;
   b) categorizing a distance between a pair of sensors as being one of anchor-anchor, anchor-target, or target-target, wherein the distance of anchor-anchor pairs is known;
   c) creating a data set of ordinal data comprising a comparative pairwise distance between each pair of sensors, wherein the data set is created using at least one of sound levels from transmitted audio, received clock times, and received signal strength measures, which are not reliable;
   d) ranking and aggregating the ordinal data to produce a set of scores, where each score represents a spatial proximity;
   e) transforming, using the known distances of the anchor-anchor pairs, the scores into estimated distances for each anchor-target pair; and
   f) inferring a location estimate of targets by formulating and solving a multidimensional unfolding optimization comprising the known anchor locations and the estimated distances for each anchor-target pair.

2. A system for determining location of a target within an indoor environment, comprising:
   a) a plurality of anchors each having known locations within the indoor environment and configured to sense an external stimulus and transmit a wireless signal;
   b) a plurality of targets positioned at unknown locations within the indoor environment, each target configured to sense an external stimulus and transmit a wireless signal;
   c) a computer processor programmed, configured, and/or structured to:
      i) classify the plurality of anchors having known locations within the indoor environment and the plurality of targets having unknown locations within the indoor environment;
      ii) categorize a distance as being between a pair either anchor-anchor, anchor-target, or target-target, wherein the distance of anchor-anchor pairs is known;
      iii) create a data set of ordinal data comprising a comparative pairwise distance between each pair;
      wherein the-data set is created using at least one of sound levels from transmitted audio, received clock times, and received signal strength measures, which are not reliable;
      iv) rank and aggregate the ordinal pair data sets to produce a set of scores, where each score represents a spatial proximity;
      v) transform, using the known distances of the anchor-anchor pairs, the scores into estimated distances for each anchor-target pair; and
      vi) infer a location estimate of the targets by formulating and solving a multidimensional unfolding optimization comprising the known anchor locations and the estimated distances for each anchor-target pair.

* * * * *